United States Patent [19]

Linzer et al.

[11] Patent Number: 5,777,677
[45] Date of Patent: Jul. 7, 1998

[54] APPROXIMATE MPEG DECODER WITH COMPRESSED REFERENCE FRAMES

[75] Inventors: Elliot Neil Linzer, Bronx, N.Y.; Roderick Michael Peters West, Colchester, Vt.; Peter Hans Westerink, Ossining, N.Y.

[73] Assignee: International Business Machines Corporation, Armonk, N.Y.

[21] Appl. No.: 599,695

[22] Filed: Feb. 9, 1996

[51] Int. Cl.[6] .............................. H04N 7/12; H04N 11/02; H04N 11/04
[52] U.S. Cl. .................. 348/397; 348/415; 348/398; 348/407; 382/233; 382/235; 382/240
[58] Field of Search ........................ 348/392, 425, 348/424, 397, 398–400, 405, 408–411, 412, 384, 390, 438, 439, 639, 714, 715, 726; 382/233, 235, 240; 386/33, 68, 81, 109, 111, 112

[56] References Cited

U.S. PATENT DOCUMENTS

| 4,918,541 | 4/1990 | Ishida et al. | 382/235 |
| 5,262,854 | 11/1993 | Ng | 358/133 |
| 5,287,420 | 2/1994 | Barret | 382/235 |
| 5,329,365 | 7/1994 | Uz | 348/469 |
| 5,386,234 | 1/1995 | Veltman et al. | 349/409 |
| 5,442,400 | 8/1995 | Sun et al. | 348/409 |
| 5,444,575 | 8/1995 | Augenbraun | 360/64 |
| 5,491,515 | 2/1996 | Suzuki | 348/409 |
| 5,544,290 | 8/1996 | Gentile | 395/115 |
| 5,581,302 | 12/1996 | Ran et al. | 348/416 |

FOREIGN PATENT DOCUMENTS 2 295 255   5/1996   United Kingdom .

Primary Examiner—Tommy P. Chin
Assistant Examiner—Nhon T. Diep
Attorney, Agent, or Firm—Scully, Scott, Murphy & Presser

[57] ABSTRACT

A method and apparatus are provided for reducing the memory requirements of a decoding subsystem by storing reference frames in compressed form. A reference picture in a sequence is decoded, compressed and stored in memory. When the reference frame is needed for motion compensation, it is decompressed.

16 Claims, 5 Drawing Sheets 5,777,677

APPROXIMATE MPEG DECODER WITH COMPRESSED REFERENCE FRAMES

BACKGROUND OF THE INVENTION a. Field of the Invention

The present invention relates to the field of data compression and, more particularly, to a system and techniques for decompressing digital motion video signals.

b. Related Art

Technological advances in digital transmission networks, digital storage media, Very Large Scale Integration devices, and digital processing of video and audio signals are converging to make the transmission and storage of digital video economical in a wide variety of applications. Because the storage and transmission of digital video signals is central to many applications, and because an uncompressed representation of a video signal requires a large amount of storage, the use of digital video compression techniques is vital to this advancing art. In this regard, several international standards for the compression of digital video signals have emerged over the past decade, with more currently under development. These standards apply to algorithms for the transmission and storage of compressed digital video in a variety of applications, including: video-telephony and teleconferencing; high quality digital television transmission on coaxial and fiber-optic networks as well as broadcast terrestrially and over direct broadcast satellites; and in interactive multimedia products on CD-ROM, Digital Audio Tape, and Winchester disk drives.

Several of these standards involve algorithms based on a common core of compression techniques, e.g., the CCITT (Consultative Committee on International Telegraphy and Telephony) Recommendation H.120, the CCITT Recommendation H.261, and the ISO/IEC MPEG-1 and MPEG-2 standards. The MPEG algorithms have been developed by the Moving Picture Experts Group (MPEG), part of a joint technical committee of the International Standards organization (ISO) and the International Electrotechnical Commission (IEC). The MPEG committee has been developing standards for the multiplexed, compressed representation of video and associated audio signals.

Video decoders are typically embodied as general or special purpose processors and memory. For a conventional MPEG-2 decoder, two decoded reference frames are typically stored in memory at the same time. Thus, the cost of memory often dominates the cost of the decoding subsystem.

SUMMARY OF THE INVENTION

The present invention reduces the memory requirements of a decoding subsystem by storing reference frames in compressed form. Both a system and method are provided. In accordance with the method, a reference picture in a sequence is decoded. It is then compressed and stored in memory. When the reference frame is needed for motion compensation, it is decompressed.

DETAILED DESCRIPTION OF THE PREFERRED EMBODIMENTS a. The MPEG-2 Environment

As the present invention may be applied in connection with an MPEG-2 decoder, in order to facilitate the understanding of the invention, some pertinent aspects of the MPEG-2 compression algorithm will be reviewed. It is to be noted, however, that the invention can also be applied to other video coding algorithms which share some of the features of the MPEG-2 algorithm.

To begin with, it will be understood that the compression of a data object, such as a page of text, an image, a segment of speech, or a video sequence, can be thought of as a series of steps, including: 1) a decomposition of that object into a collection of tokens; 2) the representation of those tokens by binary strings which have minimal length in some sense; and 3) the concatenation of the strings in a well-defined order. Steps 2 and 3 are lossless, i.e., the original data is faithfully recoverable upon reversal, and Step 2 is known as entropy coding. Step 1 can be either lossless or lossy in general. Most video compression algorithms are lossy because of stringent bit-rate requirements. A successful lossy compression algorithm eliminates redundant and irrelevant information, allowing relatively large errors where they are not likely to be visually significant and carefully representing aspects of a sequence to which the human observer is very sensitive. The techniques employed in the MPEG-2 algorithm for Step 1 can be described as predictive/interpolative motion-compensated hybrid DCT/DPCM coding. Huffman coding, also known as variable length coding, is used in Step 2.

The MPEG-2 video standard specifies a coded representation of video for transmission as set forth in ISO-IEC JTC1/SC29/WG11, Generic Coding of Moving Pictures and Associated Audio Information: Video, International Standard, 1994. The algorithm is designed to operate on interlaced or noninterlaced component video. Each picture has three components: luminance (Y), red color difference (Cr), and blue color difference (Cb). The video data may be coded in 4:4:4 format, in which case there is one Cr and one Cb sample for each Y sample, in 4:2:2 format, in which case there are half as many Cr and Cb samples as luminance samples in the horizontal direction, or in 4:2:0 format, in which case there are half as many Cr and Cb samples as luminance samples in both the horizontal and vertical directions.

Figure 1:
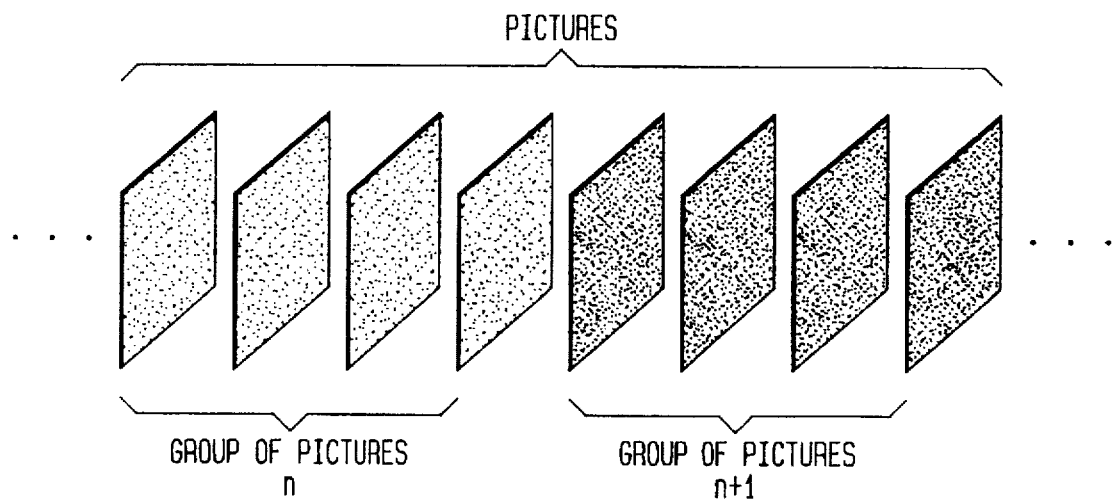
FIG. 1 shows an exemplary pair of Groups of Pictures (GOP's)
Figure 2:
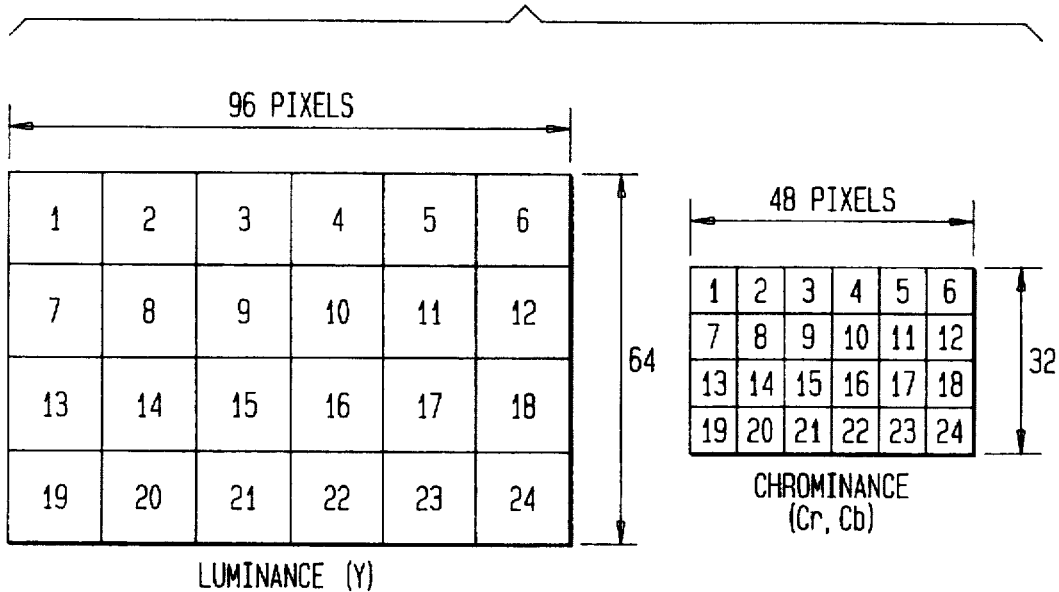
FIG. 2 shows an exemplary macroblock (MB) subdivision of a picture (for 4:2:0 format)

An MPEG-2 data stream consists of a video stream and an audio stream which are packed, together with systems information and possibly other bitstreams, into a systems data stream that can be regarded as layered. Within the video layer of the MPEG-2 data stream, the compressed data is further layered. A description of the organization of the layers will aid in understanding the invention. These layers of the MPEG-2 Video Layered Structure are shown in FIGS. 1–2. The layers pertain to the operation of the compression algorithm as well as the composition of a compressed bit stream. The highest layer is the Video Sequence Layer, containing control information and parameters for the entire sequence. At the next layer, a sequence is subdivided into sets of consecutive pictures, each known as a "Group of Pictures" (GOP). A general illustration of this layer is shown in FIG. 1. Decoding may begin at the start of any GOP, essentially independent of the preceding GOP's. There is no limit to the number of pictures which may be in a GOP, nor do there have to be equal numbers of pictures in all GOP's.

The third or Picture layer is a single picture. A general illustration of this layer is shown in FIG. 2. The luminance component of each picture is subdivided into 16×16 regions; the color difference components are subdivided into appropriately sized blocks spatially co-sited with the 16×16 luminance regions; for 4:4:4 video, the color difference components are 16×16, for 4:2:2 video, the color difference components are 8×16, and for 4:2:0 video, the color difference components are 8×8. Taken together, these co-sited luminance region and color difference regions make up the fifth layer, known as a "macroblock" (MB). Macroblocks in a picture are numbered consecutively in lexicographic order, starting with Macroblock 1.

Between the Picture and MB layers is the fourth or "slice" layer. Each slice consists of some number of consecutive MB's. Finally, each MB consists of four 8×8 luminance blocks and 8, 4, or 2 (for 4:4:4, 4:2:2 and 4:2:0 video) chrominance blocks. The Sequence, GOP, Picture, and slice layers all have headers associated with them. The headers begin with byte-aligned Start Codes and contain information pertinent to the data contained in the corresponding layer.

A picture can be either field-structured or frame-structured. A frame-structured picture contains information to reconstruct an entire frame, i.e., the combination of one field containing the odd lines and the other field containing the even lines. A field-structured picture contains information to reconstruct one field. If the width of each luminance frame (in picture elements or pixels) is denoted as C and the height as R (C is for columns, R is for rows), a frame-structured picture contains information for C×R pixels and a field-structured picture contains information for C×R/2 pixels.

The two fields in a frame are the top field and the bottom field. If we number the lines in a frame starting from 1, then the top field contains the odd lines (1, 3, 5, . . . ) and the bottom field contains the even lines (2, 4, 6, . . . ). Thus we may also call the top field the odd field and we may also call the bottom field the even field.

A macroblock in a field-structured picture contains a 16×16 pixel segment from a single field. A macroblock in a frame-structured picture contains a 16×16 pixel segment from the frame that both fields compose; each macroblock contains a 16×8 region from each of the two fields.

Within a GOP, three types of pictures can appear. The distinguishing difference among the pictures is the compression method used. The first type, Intramode pictures or I-pictures, are compressed independently of any other picture. Although there is no fixed upper bound on the distance between I-pictures, it is expected that they will be interspersed frequently throughout a sequence to facilitate random access and other special modes of operation. Predictively motion-compensated pictures (P pictures) are reconstructed from the compressed data in that picture plus two reconstructed fields from previously displayed I or P pictures. Bidirectionally motion-compensated pictures (B pictures) are reconstructed from the compressed data in that picture plus two reconstructed fields from previously displayed I or P pictures and two reconstructed fields from I or P pictures that will be displayed in the future. Because reconstructed I or P pictures can be used to reconstruct other pictures, they are called reference pictures.

With the MPEG-2 standard, a frame can be coded either as a frame-structured picture or as two field-structured pictures. If a frame is coded as two field-structured pictures, then both fields can be coded as a I pictures, the first field can be coded as an I picture and the second field as P picture, both fields can be coded as P pictures, or both fields can be coded as B pictures.

If a frame is coded as a frame-structured I picture, as two field-structured I pictures, or as a field-structured I picture followed by a field-structured P picture, we say that the frame is an I frame; it can be reconstructed without using picture data from previous frames. If a frame is coded as a frame-structured P picture or as two field-structured P pictures, we say that the frame is a P frame; it can be reconstructed from information in the current frame and the previously coded I or P frame. If a frame is coded as a frame-structured B picture or as two field-structured B pictures, we say that the frame is a B frame; it can be reconstructed from information in the current frame and the two previously coded I or P frames (i.e., the I or P frames that will appear before and after the B frame). We refer to I or P frames as reference frames.

A common compression technique is transform coding. In MPEG-2 and several other compression standards, the discrete cosine transform (DCT) is the transform of choice. The compression of an I-picture is achieved by the steps of 1) taking the DCT of blocks of pixels, 2) quantising the DCT coefficients, and 3) Huffman coding the result. In MPEG-2, the DCT operation converts a block of n×n pixels into an n×n set of transform coefficients. Like several of the international compression standards, the MPEG-2 algorithm uses a DCT block size of 8×8. The DCT transformation by itself is a lossless operation, which can be inverted to within the precision of the computing device and the algorithm with which it is performed.

The second step, quantisation of the DCT coefficients, is the primary source of lossiness in the MPEG-2 algorithm. Denoting the elements of the two-dimensional array of DCT coefficients by $c_{mn}$, where m and n can range from 0 to 7, aside from truncation or rounding corrections, quantisation is achieved by dividing each DCT coefficient $c_{mn}$ by $w_{mn}$ times QP, with $w_{mn}$ being a weighting factor and QP being the quantiser parameter. The weighting factor $w_{mn}$ allows coarser quantisation to be applied to the less visually significant coefficients. The quantiser parameter QP is the primary means of trading off quality vs. bit-rate in MPEG-2. It is important to note that QP can vary from MB to MB within a picture.

Following quantisation, the DCT coefficient information for each MB is organized and coded, using a set of Huffman codes. As the details of this step are not essential to an understanding of the invention and are generally understood in the art, no further description will be offered here.

Most video sequences exhibit a high degree of correlation between consecutive pictures. A useful method to remove this redundancy prior to coding a picture is "motion compensation". MPEG-2 provides tools for several methods of motion compensation.

The methods of motion compensation have the following in common. For each macroblock, one or more motion vectors are encoded in the bit stream. These motion vectors allow the decoder to reconstruct a macroblock, called the predictive macroblock. The encoder subtracts the "predictive" macroblock from the macroblock to be encoded to form the "difference" macroblock. The encoder uses tools to compress the difference macroblock that are essentially similar to the tools used to compress an intra macroblock.

The type of a picture determines the methods of motion compensation that can be used. The encoder chooses from among these methods for each macroblock in the picture. If no motion compensation is used, the macroblock is intra (I). The encoder can make any macroblock intra. In a P or a B picture, forward (F) motion compensation can be used; in this case, the predictive macroblock is formed from data in the previous I or P frame. In a B picture, backward (B) motion compensation can also be used; in this case, the predictive macroblock is formed from data in the future I or P frame. In a B picture, forward/backward (FB) motion compensation can also be used; in this case, the predictive macroblock is formed from data in the previous I or P frame and the future I or P frame.

Figure 4:
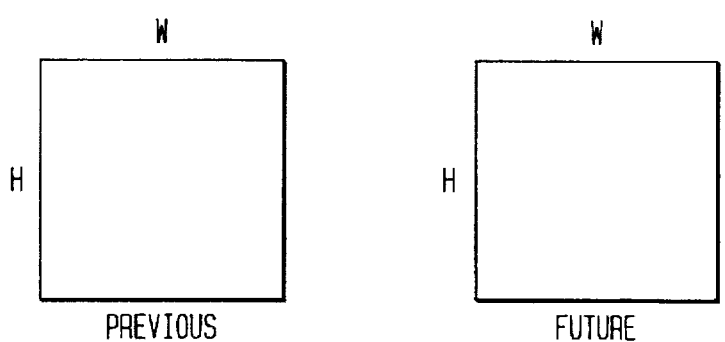
FIG. 4 shows memory usage in a conventional decoder.

Because I and P pictures are used as references to reconstruct other pictures (B and P pictures) they are called reference pictures. Because two reference frames are needed to reconstruct B frames, MPEG-2 decoders typically store two decoded reference frames in memory. The reference frame memory usage for conventional decoders is shown in FIG. 4, where we have drawn the frames with height H and width W.

Aside from the need to code side information relating to the MB mode used to code each MB and any motion vectors associated with that mode, the coding of motion-compensated macroblocks is very similar to that of intra-mode MBs. Although there is a small difference in the quantisation, the model of division by wmn times QP still holds.

The MPEG-2 algorithm can be used with fixed bit-rate transmission media. However, the number of bits in each picture will not be exactly constant, due to the different types of picture processing, as well as the inherent variation with time of the spatio-temporal complexity of the scene being coded. The MPEG-2 algorithm uses a buffer-based rate control strategy to put meaningful bounds on the variation allowed in the bit-rate. A Video Buffer Verifier (VBV) is devised in the form of a virtual buffer, whose sole task is to place bounds on the number of bits used to code each picture so that the overall bit-rate equals the target allocation and the short-term deviation from the target is bounded. This rate control scheme can be explained as follows. Consider a system consisting of a buffer followed by a hypothetical decoder. The buffer is filled at a constant bit-rate with compressed data in a bit stream from the storage medium. Both the buffer size and the bit-rate are parameters which are transmitted in the compressed bit stream. After an initial delay, which is also derived from information in the bit stream, the hypothetical decoder instantaneously removes from the buffer all of the data associated with the first picture. Thereafter, at intervals equal to the picture rate of the sequence, the decoder removes all data associated with the earliest picture in the buffer.

Figure 11:
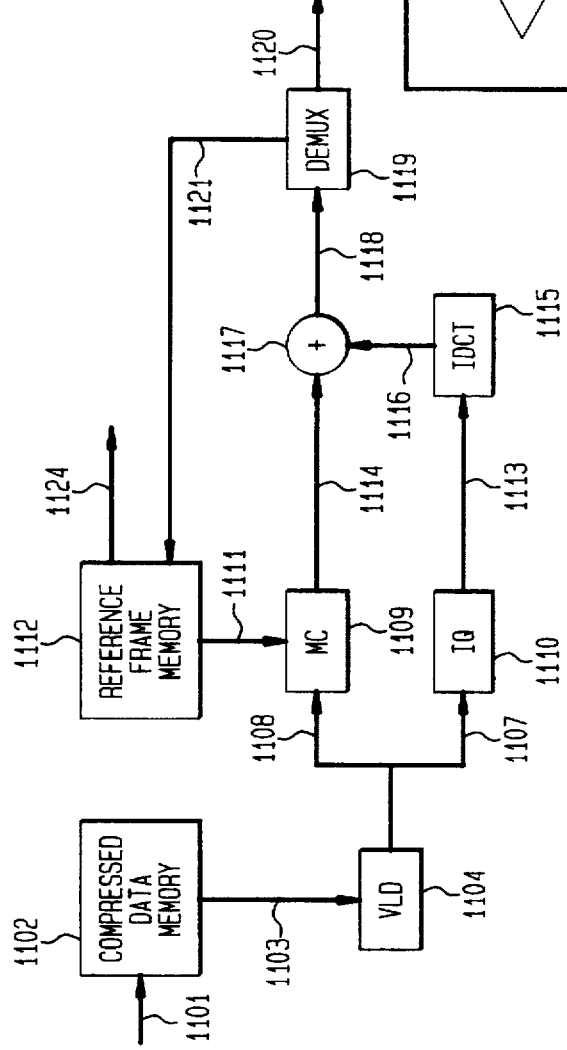
FIG. 11 is a block diagram of a conventional decoder.

FIG. 11 shows a diagram of a conventional video decoder. The compressed data enters as signal 1101 and is stored in the compressed data memory 1102. The variable length decoder 1104 reads the compressed data as signal 1103 and sends motion compensation information as signal 1108 to the motion compensation unit 1109 and quantised coefficients as signal 1107 to the inverse quantisation unit 1110. The motion compensation unit reads the reference data from the reference frame memory 1112 as signal 1111 to form the predicted macroblock, which is sent as the signal 1114 to the adder 1117. The inverse quantisation unit computes the unquantised coefficients, which are sent as signal 1113 to the inverse transform unit 1115. The inverse transform unit computes the reconstructed difference macroblock as the inverse transform of the unquantised coefficients. The reconstructed difference macroblock is sent as signal 1116 to the adder 1117, where it is added to the predicted macroblock. The adder 1117 computes the reconstructed macroblock as the sum of the reconstructed difference macroblock and the predicted macroblock. The reconstructed macroblock is then sent as signal 1118 to the demultiplexor 1119, which stores the reconstructed macroblock as signal 1121 to the reference memory if the macroblock comes from a reference picture or sends it out (to memory or display) as signal 1120. Reference frames are sent out as signal 1124 from the reference frame memory.

b. Preferred Embodiment of a Decoder

A decoding method in accordance with the principles of the present invention will now be described. Reference pictures are stored in memory in compressed form. The compression method used can be lossy or lossless and is preferably simpler than, and therefore different from, the compression used to originally compress the video. In embodiments where the compression is lossy, the decoding method will be inexact, thus, the decoded output video signal will typically differ from the output signal of a conventional video decoder.

Figure 10:
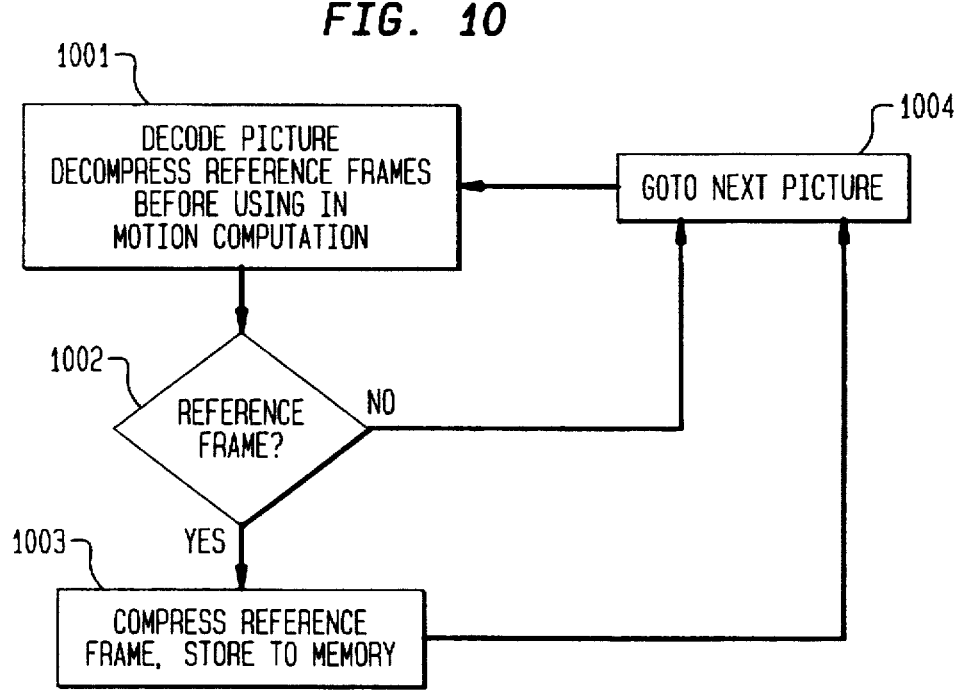
FIG. 10 is a flow chart of a decoding method in accordance with the principles of the present invention.

The steps involved in decoding are shown in FIG. 10. In step 1001, a picture is decoded, and data needed for motion compensation is decompressed before being used. Step 1002 checks if the decoded picture was a reference (I or P) picture; if it was, control moves to step 1003; otherwise, control moves to step 1004. In step 1003, the reference picture is compressed and stored to memory, and control then moves to step 1004. In step 1004, we go to the next picture and control returns to step 1001.

Figure 3:
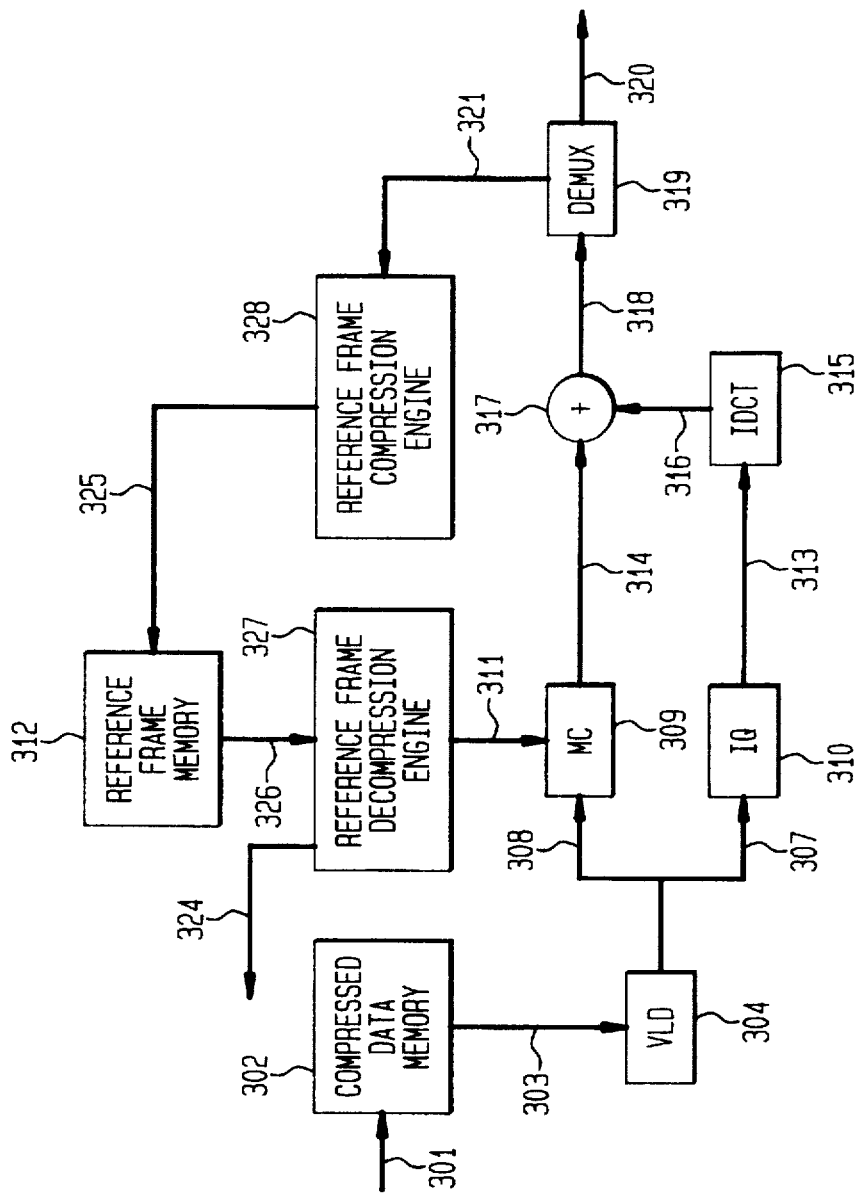
FIG. 3 shows a block diagram of a decoder in accordance with the principles of the present invention.

A block diagram of a decoder according to an embodiment of this invention is shown in FIG. 3. The decoder of FIG. 3 is preferably embodied as an application specific integrated circuit (ASIC) connected to one or more memory devices. The compressed data enters as signal 301 and is stored in the compressed data memory 302. The variable length decoder 304 reads the compressed data as signal 303 and sends motion compensation information as signal 308 to the motion compensation unit 309 and quantised coefficients as signal 307 to the inverse quantisation unit 310.

The reference frame decompression engine 327 reads compressed reference frame data signal 326 from the reference frame memory 312, decompresses the data, and sends the decompressed reference frame data as signal 311 to the motion compensation unit. The motion compensation unit uses signals 311 and 308 to form the predicted macroblock, which is sent as the signal 314 to the adder 317. The inverse quantisation unit computes the unquantised coefficients, which are sent as signal 313 to the inverse transform unit 315. The inverse transform unit computes the reconstructed difference macroblock as the inverse transform of the unquantised coefficients. The reconstructed difference macroblock is sent as signal 316 to the adder 317, where it is added to the predicted macroblock. The adder 317 computes the reconstructed macroblock as the sum of the reconstructed difference macroblock and the predicted macroblock. The reconstructed macroblock is then sent as signal 318 to the demultiplexor 319, which sends the reconstructed macroblock as signal 321 to the reference frame compression engine 327 if the macroblock comes from a reference picture or sends the data out as signal 320 if the macroblock comes from a B picture. The reference frame compression engine 328 compresses the reconstructed macroblock (signal 321) and stores the compressed version of the macroblock as signal 325 in the reference frame memory. Reference data is read out as signal 324 after being decompressed by the reference frame decompression engine.

Figure 5:
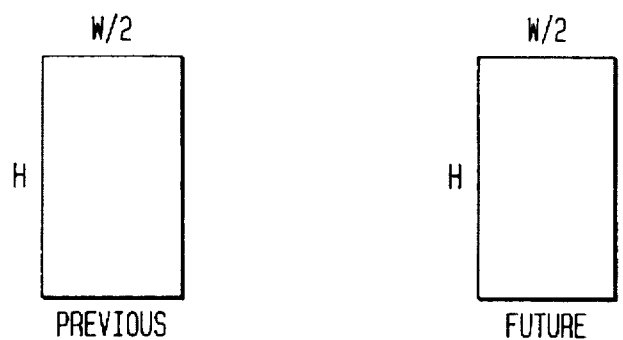
FIG. 5 shows memory usage according to a first embodiment of the reference frame compression engine of FIG. 3.

In a first embodiment of a reference frame compression engine 328, each reference frame is scaled to a smaller version of the frame and stored in memory. For example, each frame could be scaled by a factor of two horizontally and not at all vertically. This scaling is illustrated in FIG. 5. Note that for this example only half of the memory used by a conventional decoder for reference frame storage is needed for the present invention.

For the first embodiment of a reference frame compression engine, the reference frame decompression engine 327 scales the reference frame back to full size. For example, if the reference frame compression engine 328 scales by a factor of two horizontally and not at all vertically, the reference frame decompression engine 327 could repeat pixels in the scaled frame to scale back to full size.

Figure 6:
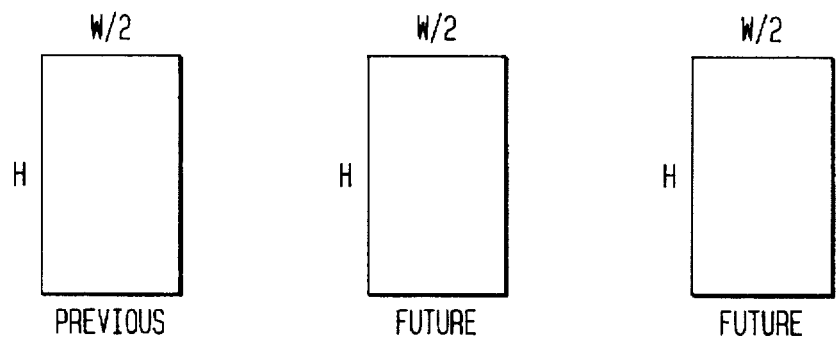
FIG. 6 shows memory usage according to a second embodiment of the reference frame compression engine of FIG. 3.

In a second embodiment of a reference frame compression engine, each reference frame is scaled to a smaller version of the frame and stored in memory, and an enhancement version of the reference frame is also stored in memory. This enhancement version is used together with the scaled version for motion compensation of P pictures. When a P picture is decoded the enhancement version of the previous reference frame is overwritten when it is no longer needed for motion compensation for the P picture being decoded. This means that when a B picture is decoded the scaled version and enhancement version of the future frame will be available for motion compensation but only the scaled version of the previous frame will be available. For example, each frame could be scaled by a factor of two horizontally and not at all vertically to create the scaled version. This scaling is done by discarding every other pixel horizontally. The discarded pixels are used as the enhancement version. In this case, by using both the enhancement version and the scaled version the frame can be reconstructed exactly. This means that P pictures (and I pictures) will be reconstructed exactly but B pictures will not. The memory allocation for this embodiment is illustrated in FIG. 6.

For this embodiment of a reference frame compression engine, the reference frame decompression engine works by scaling the reference frame back to full size, using only the scaled version if only that version is stored in memory but both the scaled and enhancement versions if both are available.

Figure 12:
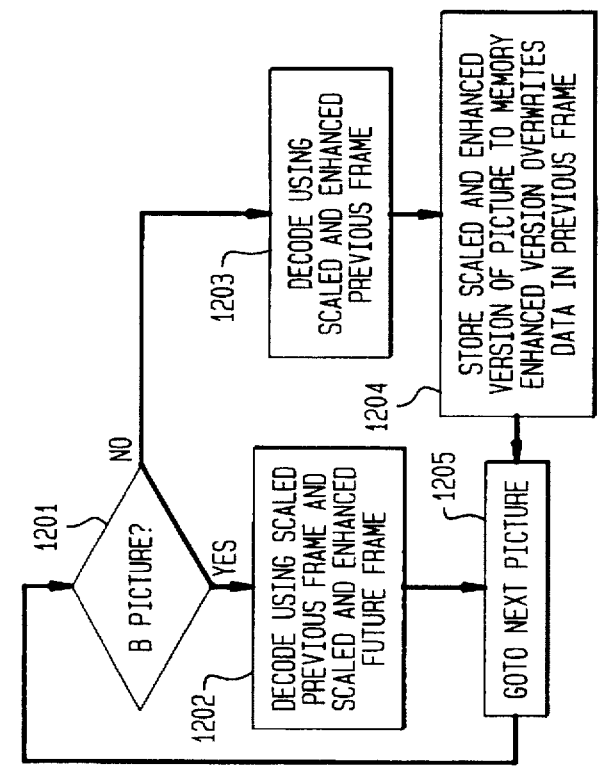
FIG. 12 is a more detailed flow chart showing an embodiment of the decoding method of FIG. 10.

The operation of a decoder using the second embodiment of a reference frame scaling engine is described by the flow chart shown in FIG. 12. Step 1201 checks if a picture to be decoded is a B picture; if it is, control goes to step 1202, and otherwise control goes to step 1203. Step 1202 decodes the B picture using the scaled previous frame and the scaled and enhanced future frame for motion compensation. Step 1203 decodes a reference picture using the scaled and enhanced version of the previous frame. After step 1203, control goes to step 1204, which stores the scaled and enhanced version of the picture to memory; the enhanced version overwrites data in the previous frame. After step 1204 or step 1202, control goes to step 1205, which moves the decoding to the next picture. Control then returns to step 1201.

Figure 7:
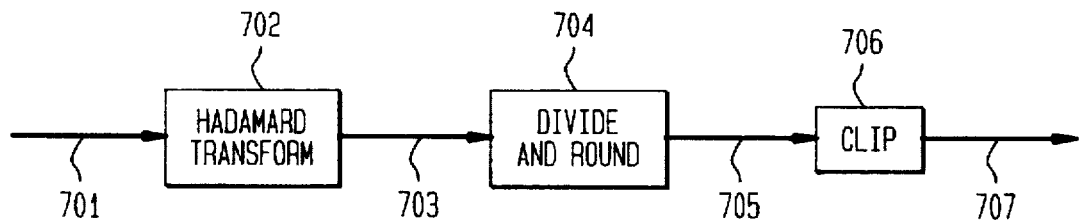
FIG. 7 shows a block diagram of an embodiment of the reference frame compression engine of FIG. 3.

A third embodiment of a reference frame compression engine is shown in FIG. 7. The reference data is segmented into blocks, and these blocks are then sent as signal 701 to a Hadamard transform unit 702. A definition of the Hadamard transform can be found in "Digital Image Processing" by C. Gonzalez and P. Wintz, second addition, 1987; section 3.5.2. In this embodiment, data is segmented into 4×1 blocks and it is then subjected to a 4×1 Hadamard transform. Denoting the inputs to a 4×1 Hadamard transform as x0, x1, x2, and x3 and the outputs as y0, y1, y2, and y3, the outputs can be computed from the inputs as:

$$y0 = x0 + x1 + x2 + x3$$
$$y1 = x0 + x1 - x2 - x3$$
$$y2 = x0 - x1 - x2 + x3$$
$$y3 = x0 - x1 + x2 - x3.$$

Figure 9:
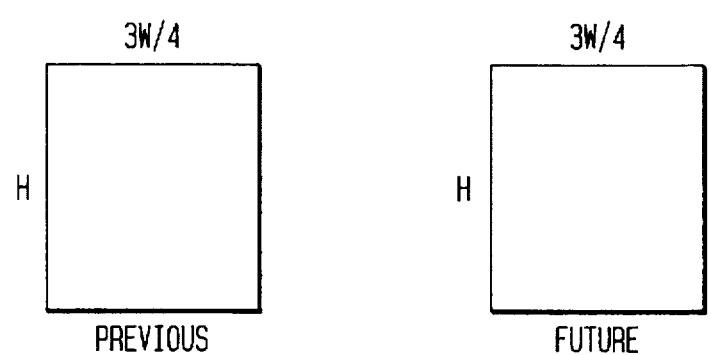
FIG. 9 shows memory usage of the reference frame compression engine of FIG. 7.

The Hadamard coefficients are sent as signal 703 to the divide and round unit 704, which divides each coefficient and rounds to the nearest integer. In this embodiment, coefficient y0 divided by 4 and the other coefficients are divided by eight. The rounded coefficients are sent as signal 705 to the clipping unit 706, which clips each coefficient to an interval and outputted as signal 707. For this embodiment, the coefficient y0 is clipped to the interval [0 255], the coefficient y1 is clipped to the interval [−32, 31], and the coefficients y2 and y3 are clipped to the interval [−16, 15]. Clipping a coefficient to the interval [A, B] means that it is replaced with A if is less then A, replaced with B if it is greater then B and unchanged otherwise. Note that because y0 is an integer in [0 255] is can be represented with 8 bits, because y1 is an integer in [−32 31] is can be represented with 6 bits, and because y2 and y3 are integers in [−16 15] they each be represented with 5 bits each. Thus y0, y1, y2 and y3 can be represented with a total of 8+6+5+5=24 bits. For this embodiment, the input data (x0, x1, x2, and x3) are 8 bit numbers, so the compression ratio is 4×8:24=4:3. The memory usage for this embodiment is shown in FIG. 9, where it is shown that each compressed row uses ¾ the storage of an uncompressed row.

Figure 8:
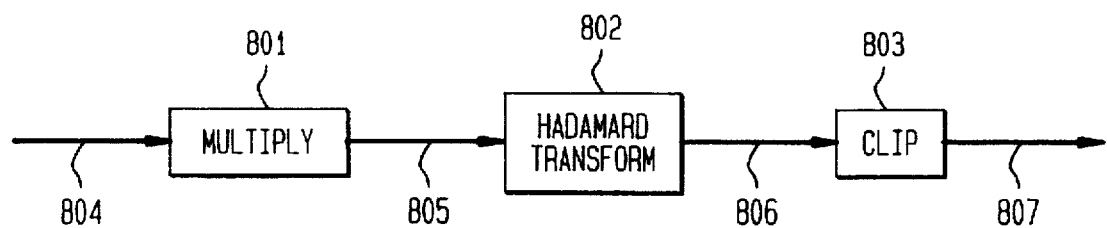
FIG. 8 shows a block diagram of an embodiment of the reference frame decompression engine of FIG. 3.

An embodiment of a reference frame decompression engine suitable for use with in the decoder of FIG. 3 when the reference frame compression engine of FIG. 7 is used is shown in FIG. 8. The compressed reference frame data is sent as signal 804 to the multiplier 801. In this embodiment, the first coefficient in each 4×1 block is multiplied by 1 and the others by two. These are then sent as signal 805 to the Hadamard transform unit, which computes the Hadamard transform on each 4×1 block. The transformed data is then sent as signal 806 to the clipping unit 803, which clips each input to [0 255], and sends out the clipped data as signal 807.

Now that the invention has been described by way of the preferred embodiments, various modifications and improvements will occur to those of skill in the art. Thus, it should be understood that the preferred embodiments have been provided as examples and not as limitations. The scope of the invention is defined by the appended claims.

We claim:

1. A method for decoding a digital video sequence comprising the steps of:
   decoding a first picture in the sequence;
   compressing the first picture so that a compression ratio thereof includes non-integer numbers;
   storing a compressed representation of the picture to a memory;

decompressing a region of the compressed representation of the first picture; and responsive to the decompressing, decoding a region of a second picture in the sequence.

2. The method of claim 1 wherein the compressing comprises the step of scaling the picture in at least one of the horizontal and vertical directions to a smaller picture.

3. The method of claim 2 wherein the scaling comprises scaling by a factor of two in the horizontal direction.

4. The method of claim 2 comprising the further step of storing an enhancement version of the first picture to memory.

5. The method of claim 1 wherein the compressing comprises the steps of:

segmenting the picture into regions;

performing a linear transformation on each region to produce transform coefficients; and quantizing the transform coefficients.

6. The method of claim 5 wherein the linear transformation is a Hadamard transform.

7. An apparatus for decoding a compressed digital video sequence comprising:

a motion compensation unit for computing reference regions from reference frames;

a reference frame compression engine for compressing reference frames with a compression ratio that includes non-integer numbers, and storing said compressed reference frames to a memory; and a reference frame decompression engine for decompressing regions of said compressed reference frames and providing said decompressed regions to the motion compensation unit.

8. The apparatus of claim 7 wherein the reference frame compression engine comprises means for scaling reference frames and storing them to memory.

9. The apparatus of claim 8 wherein the reference frame compression engine comprises means for storing an enhancement version of the compressed reference frame to memory.

10. The apparatus of claim 7 wherein the reference frame compression engine comprises:

A linear transformation unit, for performing linear transformations on regions of reference frames and forming reference frame transform coefficients; and means for quantizing the reference frame transform coefficients.

11. The apparatus of claim 10 wherein the linear transformation unit is a Hadamard transformation unit.

12. A method for decoding a digital video sequence comprising the steps of:

predicting a reference frame of said sequence from a previous reference frame stored in a memory as scaled S[n−1] and enhanced E[n−1] versions of said previous reference frame, said predicted reference frame including scaled S[n+1] and enhanced E[n+1] versions thereof;

storing in said memory said predicted reference frame scaled version S[n+1] in said memory and overwriting said previous reference frame enhanced version E[n−1] with said predicted reference frame enhanced version E[n+1];

predicting a bidirectional frame of said sequence from said previous reference frame scaled version S[n−1] and from said predicted reference frame scaled S[n+1] and enhanced E[n+1] versions.

13. The method of claim 12, wherein the reference frame predicting step, includes the steps of:

compressing said previous reference frame to form said scaled S[n−1] and enhanced E[n−1] versions thereof; and decompressing said previous reference frame scaled S[n−1] and enhanced E[n−1] versions to reconstruct an exact replica of said previous reference frame.

14. The method of claim 12, wherein the bidirectional frame predicting step, includes the steps of:

compressing said previous and future reference frames to form said previous scaled S[n−1], future scaled S[n+1], and future enhanced E[n+1] versions;

decompressing said previous reference frame scaled S[n−1] version to reconstruct an approximate replica of said previous reference frame; and decompressing said future reference frame scaled S[n−1] and enhanced E[n−1] versions to reconstruct an exact replica of said future reference frame.

15. An apparatus for decoding a compressed digital video sequence comprising:

a motion compensation unit for computing reference and bidirectional frames of said sequence;

a reference frame compression engine which compresses each of said reference frames into a compressed scaled version and a compressed enhanced version;

a memory which stores scaled versions of previous and future reference frames and an enhanced version of said future reference frame, said future reference frame enhanced version being stored over a previous reference frame enhanced version;

a reference frame decompression engine for decompressing said reference frames stored in said memory, and providing said decompressed reference frames to the motion compensation unit.

16. The apparatus of claim 13, wherein said decompression engine reconstructing an exact replica of said future reference frame from said future reference frame scaled and enhanced versions, and an approximate replica of said previous reference frame said previous reference frame scaled version stored in said memory.

* * * * *